United States Patent
McCullough et al.

(10) Patent No.: US 6,900,154 B2
(45) Date of Patent: May 31, 2005

(54) METHODS OF FORMING A SUPPORTED ACTIVATED CATALYST COMPOSITION

(75) Inventors: Laughlin G. McCullough, League City, TX (US); Matthew W. Holtcamp, Huffman, TX (US)

(73) Assignee: Univation Technologies, LLC, Houston, TX (US)

( * ) Notice: Subject to any disclaimer, the term of this patent is extended or adjusted under 35 U.S.C. 154(b) by 59 days.

(21) Appl. No.: 10/645,817

(22) Filed: Aug. 21, 2003

(65) Prior Publication Data

US 2004/0102312 A1 May 27, 2004

Related U.S. Application Data

(60) Provisional application No. 60/429,114, filed on Nov. 26, 2002.

(51) Int. Cl.$^7$ .............................. C08F 4/64; C08F 4/102; C08F 4/642
(52) U.S. Cl. ....................... 502/119; 502/104; 502/120; 502/152; 502/167; 526/129; 526/135; 526/160; 526/943; 526/172
(58) Field of Search ................................ 502/104, 119, 502/120, 152, 167; 526/129, 135, 160, 943

(56) References Cited

U.S. PATENT DOCUMENTS

| | | | |
|---|---|---|---|
| 5,721,185 A * | 2/1998 | LaPointe et al. ............ 502/117 |
| 6,147,174 A | 11/2000 | Holtcamp .................... 526/160 |
| 6,239,059 B1 | 5/2001 | Saudemont ................. 502/120 |
| 6,368,999 B1 | 4/2002 | Speca ......................... 502/420 |
| 6,380,328 B1 | 4/2002 | McConville ............... 5826/119 |
| 6,391,989 B1 | 5/2002 | Bohnen ....................... 526/134 |
| 6,432,863 B2 | 8/2002 | Ward .......................... 502/152 |
| 6,475,945 B1 | 11/2002 | Carnahan et al. ............. 502/87 |
| 6,524,988 B2 | 2/2003 | Speca ......................... 502/152 |
| 6,605,561 B1 | 8/2003 | Saudemont et al. ........ 502/120 |
| 6,613,712 B1 | 9/2003 | McDaniel et al. .......... 502/104 |
| 6,664,348 B2 | 12/2003 | Speca ......................... 526/133 |
| 6,667,272 B2 | 12/2003 | Speca ......................... 502/402 |
| 2002/0123582 A1 | 9/2002 | Speca ......................... 526/160 |
| 2004/0092387 A1 * | 5/2004 | Matsunaga ................. 502/117 |

* cited by examiner

*Primary Examiner*—Caixia Lu
(74) *Attorney, Agent, or Firm*—Kevin M. Faulkner

(57) ABSTRACT

Processes of forming a supported activated catalyst composition and method of polymerization are disclosed, the process of forming the composition including combining a halogenated aromatic aluminum activator compound with a fluorinated support and a catalyst to form a supported activated catalyst composition. Also disclosed is a supported activated catalyst composition, comprising the reaction product of a fluorinated support, a perfluorophenyl aluminum activator and in one embodiment a metallocene catalyst. In one embodiment, the halogenated aromatic aluminum activator is represented by the formula $R_nAl(ArHal)_{3-n}$, wherein ArHal is a halogenated aryl group, R is a monoanionic ligand, and n is 1 or 2.

16 Claims, No Drawings

METHODS OF FORMING A SUPPORTED ACTIVATED CATALYST COMPOSITION

CROSS-REFERENCE TO RELATED APPLICATION

The present application claims priority to Provisional U.S. Patent Application U.S. Ser. No. 60/429,114 filed Nov. 26, 2002.

BACKGROUND

1. Field of Invention

This application relates to supported activated catalyst compositions and methods of forming supported activated catalyst compositions using fluorine-modified supports.

2. Description of Related Art

As reflected in the patent literature, a great deal of effort has been expended towards discovering improvements in polymerization processes. For many polymerization processes, supported catalysts are required, and various methods of attaching metallocene catalysts to a support are known in the art. Supports suitable for use with metallocene catalyst are generally porous materials and can include organic materials, inorganic materials and inorganic oxides.

However, many supports contain reactive functionalities. In some instances, these reactive functionalities may deactivate or reduce the activity of the catalyst fixed to the support. When this occurs, the addition of more catalyst to the catalyst system may be necessary to ensure sufficient polymer production during olefin polymerization. Increasing the catalyst concentration in the catalyst system to compensate for activity reduction caused by reactive functionalities has various shortcomings. For instance, the addition of more catalyst may also require the addition of more activator. As such, increasing the concentrations of both catalyst and activator to overcome the effects of catalyst deactivation by reactive functionalities may substantially increase the cost of olefin polymerization.

Hydroxyl groups are an example of a reactive functionality present on some supports, which tend to deactivate metallocene catalysts. Hydroxyl groups are present on supports, such as inorganic oxides. An example of an inorganic oxide is silica gel. As such, when using silica gel to support a metallocene catalyst, it is desirable to remove, reduce or render inactive a sufficient number of the hydroxyl groups, wherein the sufficient number may be any excess hydroxyl groups that are not going to be exchanged with an activator in subsequent processes. Methods of removing or reducing the number of hydroxyl groups include thermal and/or chemical treatments.

Thermally treating or heating the support material generally avoids contamination of the support by undesirable chemicals. However, in the case of many porous supports, such as silica gel, heating the support may fail to achieve sufficient dehydroxylation. Chemically treating the support material can be expensive and may result in contamination of the support.

Thus, there remains a need for providing supported metallocene catalyst systems with high activity. Particularly, there remains a need for improved supported metallocene catalysts wherein the reactive functionalities of the support are reduced and/or deactivated.

SUMMARY

This invention relates to a process of forming a supported activated catalyst composition. In one or more specific embodiments, the process includes combining a halogenated aromatic aluminum activator compound with a fluorinated support and a catalyst to form a supported activated catalyst composition.

In at least one specific embodiment, a process includes forming a supported activated catalyst composition, comprising contacting a perfluorophenyl aluminum activator compound with a fluorinated silica support for a time sufficient to form a supported activator composition comprising aluminum in an amount of from 2 wt. % to 0.35 wt. % and hydroxyl groups in an amount of about 0.1 mmol OH/g support or less.

Another specific embodiment includes a supported activated catalyst composition, including the reaction product of a fluorinated support, a perfluorophenyl aluminum activator attached to the fluorinated support and a metallocene catalyst combined with the perfluorophenyl aluminum activator.

In one or more specific embodiments, the halogenated aromatic aluminum activator compound has the formula $R_nAl(ArHal)_{3-n}$, wherein ArHal is a halogenated aryl group, R is a monoanionic group which is a halogenated aryl group in one embodiment, and n is 1 or 2. In yet another specific embodiment, the halogenated aromatic aluminum activator compound includes perfluorophenyl aluminum. In another specific embodiment, the halogenated aromatic aluminum activator compound includes at least one fluorine group.

In yet another specific embodiment, the halogenated aromatic aluminum activator compound includes aluminum and the fluorinated support includes hydroxyl groups, wherein the halogenated aromatic aluminum activator is combined with the fluorinated support in an amount of from 1 equivalent (eq.) to about 3 equivalents.

DETAILED DESCRIPTION

Definitions

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The term "catalyst" or "catalyst compound" broadly encompasses activated and non-activated catalyst compounds, e.g., with or without an activator, the latter sometimes referred to as a catalyst precursor.

As used herein, structural formulas are employed as is commonly understood in the chemical arts; lines ("-") used to represent associations between a metal atom ("M", Group 3 to Group 12 atoms) and a ligand, ligand atom or atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

The term "dehydrated" is understood as having the broadest definition persons in the pertinent art have given that term in describing catalyst support materials, e.g., silica, as reflected in printed publications and issued patents, and includes any material, e.g., a support particle, from which a majority of the contained water has been removed.

Activator Compounds

Embodiments of the present invention include a supported activator composition and the method of forming such a composition, the method including combining a halogenated aromatic aluminum activator compound with a fluorinated support; and further, the formation of supported activated catalyst compounds by further addition of a catalyst compound. The supported activated catalyst compounds of the invention are suitable polymerization catalysts, and particularly well suited as catalyst for α-olefin polymerization. As mentioned below, the halogenated aromatic aluminum activator compound, fluorinated support and the catalyst compound can be combined in a number of ways and sequences. An "activator" is defined herein to be any compound or component, or combination of compounds or components, capable of enhancing the ability of the catalyst, e.g., the one or more metallocene catalysts, to polymerize olefins to polyolefins. In the present invention, the catalyst compounds described are desirably activated by a halogenated aromatic aluminum activator compound that has been contacted with a fluorinated support material; and in another embodiment, is first activated by the halogenated aromatic aluminum activator compound and then contacted with a support material.

As used herein, the term "halogenated aromatic aluminum activator compound" means an activator comprising at least one aromatic group comprising at least one halogen atom (e.g., fluorine), and at least one aluminum compound, wherein the halogen is bound to the aromatic group. In one or more specific embodiments, the halogenated aromatic activator halogenated aromatic aluminum activator is a Lewis acid that includes aluminum, which is exemplified further by the formula (I) below, and has at least one bulky, electron-withdrawing ancillary ligand, e.g., an electronically stabilizing, compatible noncoordinating anion.

An example of a halogenated aromatic aluminum activator compound can be described by the following formula (I):

$$R_nAl(ArHal)_{3-n} \qquad (I)$$

where Al is an aluminum atom, R is a monoanionic ligand and ArHal is a halogenated $C_6$ aromatic or higher carbon number polycyclic aromatic hydrocarbon or aromatic ring assembly in which two or more rings (or fused ring systems) are joined directly to one another or together, and n is 1 to 2, preferably n is 1. In at least one embodiment, at least one ArHal is a halogenated $C_6$ aromatic or higher, preferably a fluorinated phenyl or naphthyl group. Suitable non-limiting R ligands include: substituted or unsubstituted $C_1$ to $C_{30}$ hydrocarbyl aliphatic or aromatic groups, wherein the term substituted means that at least one hydrogen on a carbon atom is replaced with a hydrocarbyl, halide, halocarbyl, hydrocarbyl or halocarbyl substituted organometalloid, dialkylamido, alkoxy, siloxy, aryloxy, alkysulfido, arylsulfido, alkylphosphido, alkylphosphido or other anionic substituent. An R ligand can also be a fluoride or a bulky alkoxide, where the term bulky refers to $C_4$ and higher numbered hydrocarbyl groups, e.g., up to about $C_{20}$, such as tert-butoxide and 2,6-dimethylphenoxide, and 2,6-di(tert-butyl)phenoxide. An R ligand can also be —SR; —NR$_2$, or —PR$_2$, where each R is independently a substituted or unsubstituted hydrocarbyl as defined above. Additionally, an R ligand can be $C_1$ to $C_{30}$ hydrocarbyl substituted organometalloid, such as trimethylsilyl. In a particular embodiment, R is the same as ArHal.

Examples of ArHal include the halogenated, preferably fluorinated, phenyl, naphthyl and anthracenyl radicals described in U.S. Pat. No. 5,198,401. Additional examples are the biphenyl radicals described in WO 97/29845 when halogenated. By "halogenated", or "fluorinated", it is meant that the aryl group comprises at least two halogen (or fluorine) groups in place of a hydride, and in a particular embodiment, all hydrides are replaced by a halogen atom (fluorine atom). Preferably, the aromatic ligands are perhalogenated, e.g., replacing as many hydrogen atoms as possible on the carbon atoms with the halogen atoms. Fluorine is the most preferred halogen, although any halogen may be included. Preferably, the halogenated aromatic aluminum activator compound includes at least two fluorine atoms. The halogenated aromatic aluminum activator compound may include more than two fluorine atoms. Preferably, ArHal is a fluorophenyl group. More preferably, the halogenated aromatic aluminum activator compound is perfluorophenyl aluminum.

Desirably, Lewis base-containing support substrates, e.g., the porous supports comprising hydroxyl groups, react with the Lewis acidic activator to form a support bonded to the Lewis acid activator, where one R group of $R_nAl(ArHal)_{3-n}$ is abstracted or dissociates from the activator, allowing the aluminum atom to bond to the substrate, desirably through a hydroxyl group ("OH") or deprotonated hydroxyl group of the support. The reaction product "R" or "R—H" can be separated from the supported activator by techniques common in the art, such as by extraction with a solvent, preferably an alkane, alkene or aromatic solvent. The desired product, the supported activator composition, can be represented by the structure Sup-Al(ArHal)$_2$ in one embodiment, and more particularly, I—O—Al(ArHal)$_2$, wherein "I" is a support material comprising an oxygen "O", the support, desirably an inorganic oxide, bound to the activator Al atom through an oxygen. The Lewis base hydroxyl groups found on silica are examples of metal/metalloid oxides where this method of bonding to a support at one of the aluminum coordination sites occurs. Preferable support substrates include Group 4 to Group 14 inorganic oxide supports and hydroxylated polymeric supports, and more particularly, Group 13 and 14 inorganic oxide supports, and even more particularly, silica or alumina-oxide based supports.

Fluorinated Support

As used herein, the terms "fluorinated support composition" and "fluorinated support" mean a support, desirably particulate and porous, that includes fluorine atoms bound to its surface, i.e., one that has been fluorinated in some manner, e.g., treated with at least one inorganic fluorine-containing compound or other fluoriding agent.

Preferably, the fluorinated support of this invention also includes an effective number of reactive hydroxyl groups, i.e., a number that is sufficient for binding the halogenated aromatic aluminum activator compound to the fluorinated support. Preferably, however, the number of reactive hydroxyl groups in excess of that number needed to bind the halogenated activator compound to the support is minimized to the greatest extent possible, and preferably there are no excess hydroxyl groups present, since that excess number of reactive hydroxyl groups tends to interfere with the performance of the catalyst during polymerization.

An example of a support material that can be fluorinated is an inorganic oxide material, for example, silicon dioxide, which includes reactive hydroxyl groups both prior to and after fluorination. The support material is preferably porous and can include, for example, organic materials and/or inorganic materials including inorganic oxides. Specific examples of suitable support materials include talc, clay, silica, alumina, magnesia, zirconia, iron oxides, boria, calcium oxide, zinc oxide, barium oxide, thoria, aluminum phosphate gel, and mixtures thereof. Examples of organic supports are polymeric supports, such as hydroxyl-functional-group-containing polymeric substrates. Functional groups may be any of the primary alkyl amines, secondary alkyl amines, and others, where the groups are structurally incorporated in a polymeric chain and capable of a acid-base reaction with the Lewis acid such that a ligand filling one coordination site of the aluminum is protonated and replaced by the polymer incorporated functionality. See, for example, the functional group containing polymers of U.S. Pat. No. 5,288,677.

Preferable support materials are silica and silica containing metal oxide, which are readily available, for example, as silica particles, gels and glass beads. Desirably the silicon dioxide used herein is porous and has a surface area in the range of from about 10 to about 700 m$^2$/g, a total pore volume in the range of from about 0.1 to about 4.0 cc/g and an average particle diameter in the range of from about 10 to about 500 μm. More desirably, the surface area is in the range of from about 50 to about 500 m$^2$/g, the pore volume is in the range of from about 0.5 to about 3.5 cc/g and the average particle diameter is in the range of from about 15 to about 150 μm. Most desirably the surface area is in the range of from about 100 to about 400 m$^2$/g, the pore volume is in the range of from about 0.8 to about 3.0 cc/g and the average particle diameter is in the range of from about 10 to about 100 μm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

Alternatively, the support material may be an inorganic oxide, but may also be a covalently bonded metal/metalloid oxide or polymeric support. The metal or metalloid oxide supports described herein preferably have surface hydroxyl groups exhibiting a pK$_a$ equal to or less than that observed for amorphous silica, e.g., pK$_a$ less than or equal to about 11. Any of the conventionally known inorganic oxides, silica, or any other support materials that retain hydroxyl groups (i.e., reactive hydroxyl groups), particularly after dehydration treatment, will be suitable as support materials in accordance with the invention.

The metal oxide compositions may additionally contain oxides of other metals, such as those of Al, K, Mg, Na, Si, Ti and Zr, which may be treated by thermal and/or chemical means to remove water and free oxygen. Such treatments can be conducted in various ways, e.g., in a vacuum, in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained, e.g., a sufficient number of hydroxyl groups remain in the support material. Thus, calcining at up to 800° C. or more up to a point prior to decomposition of the support material for several hours is permissible, and if higher loading of supported anionic activator is desired, lower calcining temperatures for lesser times should be suitable. Where the metal oxide is silica, loadings to achieve from less than 0.1 mmol to 3.0 mmol activator/g SiO$_2$ are typically suitable and can be achieved, for example, by varying the temperature of calcining from 200 to 1200° C. in one embodiment, and from 400 to 1000° C. in another embodiment, and from 500 to 900° C. in yet another embodiment. Desirably, the support is calcined at a temperature below 700° C., and even more preferably, calcined in the presence of the fluoriding agent.

As discussed above, reactive hydroxyl groups are available as attachment sites on the support surface. Preferably, the number of hydroxyl groups on the support is equal to the number of coordination sites, e.g., bonding sites, of the halogenated aromatic aluminum activator compound, e.g., of the perfluorophenyl aluminum activator compound described herein. Accordingly, a fluorinated support is provided for contacting with halogenated aromatic aluminum activator. Prior to being contacted with the halogenated aromatic aluminum activator, the fluorinated support preferably has from 0.001 mmol OH/g silica to 1 mmol OH/g silica; more preferably from 0.01 mmol OH/g silica to 0.8 mmol OH/g silica; and even more preferably, from 0.1 mmol OH/g silica to 0.35 mmol OH/g silica. In at least one preferred aspect, a method is provided in which a support having a first amount of active hydroxyl groups (e.g., in any one of the amounts specified above) is fluorinated to provide a fluorinated support having a second amount of active hydroxyl groups, wherein the second amount is less than the first amount. The second amount preferably corresponds (either is equal to or exceeds) to the number of coordination sites needed for covalent bonding with the halogenated aromatic aluminum activator compound. The amount of hydroxyl groups may be measured by any test known by one skilled in the art. The measured amount of OH groups is generally quantified in terms of the OH groups available for attachment with the metallocene compound.

The fluorine compounds suitable for fluorinating the support material, e.g., to form the fluorinated support, are desirably inorganic fluorine containing compounds. Such inorganic fluorine containing compounds may include any compound containing a fluorine atom that does not include a carbon atom. Examples of inorganic fluorine containing compounds useful as fluoriding agents are selected from the group consisting of NH$_4$BF$_4$, (NH$_4$)$_2$SiF$_6$, NH$_4$PF$_6$, NH$_4$F, (NH$_4$)$_2$TaF$_7$, NH$_4$NbF$_4$(NH$_4$)$_2$GeF$_6$, (NH$_4$)$_2$SmF$_6$, (NH$_4$)$_2$TiF$_6$, (NH$_4$)$_2$ZrF$_6$, MoF$_6$, ReF$_6$, GaF$_3$, SO$_2$ClF, F$_2$, SiF$_4$, SF$_6$, ClF$_3$, ClF$_5$, BrF$_5$, IF$_7$, NF$_3$, HF, BF$_3$, and NH$_4$HF$_2$. Of these, ammonium hexafluorosilicate and ammonium tetrafluoroborate are preferably fluoriding agents.

Ammonium hexafluorosilicate and ammonium tetrafluoroborate fluorine compounds are typically solid particulates as are the inorganic oxide, e.g., silicon dioxide, supports. A desirable method of treating the support material with the fluorine compound is to dry mix the two components by blending them at a concentration of from 0.01 to 10.0 millimole F/g of support material, desirably in the range of from 0.05 to 6.0 millimole F/g of support material, and most desirably in the range of from 0.1 to 3.0 millimole F/g of support material. The fluorine compound can be dry mixed with the support material either before or after charging to the vessel for dehydration or calcining the support material. Accordingly, the fluorine concentration present in the fluorinated support is in the range of from 0.6 to 3.5 wt. % of support material. The fluorine concentration is generally determined by individual system requirements. Preferably, the fluorine concentration present in the fluorinated support is sufficient to provide a number of hydroxyl groups essentially equal to the number of coordination sites present in the halogenated aromatic aluminum activator compound. For example, the halogenated aromatic aluminum activator compound can be combined with the fluorinated support in an amount of from 1OH:1Al to 1OH:5Al (molar ratio). More preferably, the halogenated aromatic aluminum activator compound can be combined with the fluorinated support in an amount of from 1OH:1Al to 1OH:3Al. Most preferably, the halogenated aromatic aluminum activator compound is combined with the fluorinated support in a molar ratio of 1OH:1Al. As described above, the halogenated aromatic aluminum activator compound may be combined with the fluorinated support in excess of 1 eq. The excess halogenated aromatic aluminum activator compound is then subsequently removed by methods known to one skilled in the art, such as filtering.

Another method of treating the support material with the fluorine compound is to dissolve the fluorine compound in a solvent, such as water, and then contact the support material with the fluorine containing solution. When water is used and silica is the support material, it is desirable to use a quantity of water that is less than the total pore volume of the support material.

Dehydration or calcining processes at high temperatures to remove substantially all of the excess hydroxyl groups, e.g., temperatures greater than 600° C., can degrade the silica. As used herein, the terms "dehydration" and "calcining" are interchangeable. Therefore, it is preferable that the fluorination of the silica is carried out in conjunction with a dehydration or calcining process, i.e., at the same time. Performing fluorination and dehydration at the same time preferably provides fewer hydroxyl groups at a specified temperature, e.g., 600° C., than the number of hydroxyl groups using dehydration alone (at that same temperature). Preferably, performing dehydration at temperatures of 600° C. or less while fluorinating the silica in the manner described herein provides silica having hydroxyl groups in an amount of 0.65 mmol OH/g silica or less. The reaction between the silica and fluorine compound can be carried out at a temperature of from less than 700° C. in one embodiment, and more desirably from less than 600° C. in another embodiment for a time sufficient to fluorinate the silica, e.g., about two to eight hours.

In one embodiment, the resulting fluorinated support composition may be generically represented by the formula (II):

$$\text{Sup-F} \qquad \qquad \text{(II)}$$

where "Sup" is a support, "F" is a fluorine atom bound to the support. The fluorine atom may be bound, directly or indirectly, chemically or physically to the support material.

In another embodiment, the resulting fluorinated support composition may be generically represented by the formula (III):

$$\text{Sup-L-F}_n \qquad \qquad \text{(III)}$$

where "Sup" is a support material selected from the group which includes talc, clay, silica, alumina, magnesia, zirconia, iron oxides, boria, calcium oxide, zinc oxide, barium oxide, thoria, aluminum phosphate gel, polyvinylchloride and substituted polystyrene; "L" is a first member selected from the group which includes (i) Group 3 to Group 15 atoms, more preferably Group 4 to Group 14 atoms, and even more preferably B, Ta, Nb, Ge, Ga, Sn, Si, P, Ti, Mo, Re, or Zr bound to the Sup and to the F; and (ii) O bound to the Sup and bound to a second member selected from the group consisting of Group 4 to Group 14 atoms, and more preferably B, Ta, Nb, Ge, Ga, Sn, Si, P, Ti, Mo, Re, or Zr which is bound to the F; where "F" is a fluorine atom; and "n" is an integer from 1 to 7.

An example of such bonding sufficient to bound the F to the Sup would be chemical or physical bonding, such as, for example, covalent and ionic bonding.

Preferably "L" will be used sparingly and will be those having a single ligand reactive with the silanol groups (e.g., $(CH_3)_4SiCl$), or otherwise hydrolyzable, so as to minimize interference with the reaction of the transition metal catalyst compounds with the bound activator. If calcining temperatures below 400° C. are employed, difunctional coupling agents (e.g., $(CH_3)_3SiCl_2$) may be employed to cap hydrogen bonded pairs of silanol groups which are present under the less severe calcining conditions. See for example, Gorski, et al, *Investigation of Quantitative SiOH Determination by the Silane Treatment of Disperse Silica* in 126(2) JOURNAL OF COLLOID AND INTERFACE SCIENCE (December 1988), for discussion of the effect of silane coupling agents for silica polymeric fillers that will also be effective for modification of silanol groups on the catalyst supports of this invention. Similarly, use of the Lewis acid in excess of the stoichimetric amount needed for reaction with the transition metal compounds will serve to neutralize excess silanol groups without significant detrimental effect for catalyst preparation or subsequent polymerization.

In one or more specific embodiments, an activated support is first prepared, preferably in the manner described above; then that activated support is treated (e.g., combined with ingredients that form the catalyst component) to provide a supported catalyst that includes the catalyst component.

Catalyst Compounds

The catalyst compounds useful in the present invention may include any transition metal compounds suitable for olefin polymerization, such as Ziegler-Natta catalysts, Group 15-containing catalyst compounds, and metallocene catalyst compounds. Ziegler-Natta catalyst components are well known in the art and described, for example, in ZIEGLER CATALYSTS 363–386 (G. Fink, R. Mulhaupt and H. H. Brintzinger, eds., Springer-Verlag 1995). Examples of such catalysts include those comprising $TiCl_4$ and other such transition metal oxides and chlorides, which may be "supported" using magnesium compounds such as $MgCl_2$, and additionally, a support such as an inorganic oxide may be present. One aspect of the present invention also includes the catalyst compounds called "Group 15-containing" catalyst compounds, either alone or for use with a metallocene or other olefin polymerization catalyst components. Generally, "Group 15-containing catalyst components", as referred to herein, include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. Nos. 5,318,935; 5,889,128, 6,333,389 B2 and 6,271,325 B1. In one embodiment, the Group 15-containing catalyst components useful in the present invention include Group 4 imino-phenol complexes, Group 4 bis(amido) complexes, and Group 4 pyridyl-amide complexes that are active towards olefin polymerization to any extent.

Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCEN-BASED POLYOLEFINS 261–377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in a particular embodiment as described further below, and may be supported with or without another catalyst component.

Representative metallocene compounds have the formula (IV):

$$L^A L^B L^C_i MAB \qquad (IV)$$

where $L^A$ is bound to M and is a substituted or unsubstituted cyclopentadienyl ligand or ligand isolobal to cyclopentadienyl, which includes heterocyclopentadienyl ligands; $L^B$ is bound to M and is a ligand as defined for $L^A$, or is a heteroatom ligand, especially a Group 15 containing moiety bound to M forming a mono-Cp metallocene such as disclosed in U.S. Pat. No. 5,026,798; $L^C$ is an optional neutral, nonoxidizing ligand bound to M, where i is 0 to 3; M is a Group 4, 5 or 6 transition metal; and, A and B are independently monoanionic ligands, each bound to M; and optionally bridged to each other or $L^A$ or $L^B$, which can be broken for abstraction purposes by a suitable activator and into which a polymerizable monomer or macromonomer can insert for coordination polymerization. In another embodiment of the metallocene in (IV), a divalent or trivalent bridging group is present that is bound to each of $L^A$ and $L^B$ to form, for example, a bridged bis-Cp metallocene. Desirable bridging groups include —Si(R)$_2$—groups and —C(R)$_2$—groups, wherein R is a halogen, a $C_1$ to $C_{10}$ alkyl or a $C_6$ to $C_{24}$ aryl; wherein any two R groups may be bound together to form a ring structure.

Non-limiting examples of A and B include hydride, chloride ion, fluoride ion, $C_1$ to $C_{10}$ alkyls, $C_7$ to $C_{21}$ alkylaryls, $C_7$ to $C_{21}$ arylalkyls and $C_6$ to $C_{20}$ aryls, and heterocyclic or heteroatom-containing versions thereof. In a particular embodiment, A and B are selected from $C_1$ to $C_{10}$ alkyls and $C_6$ to $C_{12}$ aryls.

Non-limiting examples of $L^A$ include cyclopentadienyl, indenyl, fluorenyl cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof. Non-limiting examples of substituent groups that may be bound to $L^A$ in place of hydride groups include alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof; and in a particular embodiment, the substituent are selected from fluoride, chloride, methyl, ethyl, propyl, butyl, benzyl, phenyl, and isomers thereof.

Non-limiting representative metallocene compounds include mono-cyclopentadienyl compounds such as pentamethylcyclopentadienyltitanium isopropoxide, pentamethylcyclopentadienyltribenzyl titanium, dimethylsilyltetramethyl-cyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butylmethylcyclopentadienyl) zirconium dimethyl, bis(1,3-butylmethylcyclopentadienyl) zirconium difluoride, pentamethylcyclopentadienylcyclopentadienyl zirconium dimethyl, (tetramethylcyclopentadienyl)(n-propylcyclopetadienyl) zirconium dimethyl; bridged bis-cyclopentadienyl compounds such as dimethylsilylbis(tetrahydroindenyl) zirconium dichloride and silacyclobutyl (tetramethylcyclopentadienyl)(n-propyl-cyclopentadienyl) zirconium dimethyl; bridged bisindenyl compounds such as dimethylsilylbis(indenyl) zirconium dichloride, dimethylsilylbis(indenyl)zirconium difluoride, dimethylsilylbis(indenyl) hafnium dimethyl, dimethylsilylbis(2-methylbenzindenyl) zirconium dichloride, dimethylsilylbis(2-methylbenzindenyl) zirconium dimethyl; and fluorenyl ligand-containing compounds, e.g., diphenylmethyl(fluorenyl) (cyclopentadienyl)zirconium dimethyl; and the additional mono- and bis-cyclopentadienyl compounds such as those listed and described in U.S. Pat. Nos. 5,017,714 and 5,324,800 and EP-A-0 591 756.

In a particular embodiment of the present invention, metallocenes having alkyl leaving groups are desirable for combining with the supported activator and/or the activator alone. Metallocenes having non-alkyl leaving groups can be converted to those having one or more alkyl leaving groups (A and B in (IV) above) by techniques known in the art.

Representative traditional Ziegler-Natta transition metal compounds include tetrabenzyl zirconium, tetra-bis (trimethylsilylmethyl)zirconium, oxotris (trimethylsilylmethyl)vanadium, tetrabenzyl hafnium, tetrabenzyl titanium, bis(hexamethyl disilazido)dimethyl titanium, tris(trimethyl silyl methyl)niobium dichloride, tris (trimethylsilylmethyl)tantalum dichloride. Features of such compositions for coordination polymerization are the ligand capable of abstraction and that ligand into which the ethylene (olefinic) group can be inserted. These features enable the ligand abstraction from the transition metal compound and the concomitant formation of the ionic catalyst composition of the invention. Others include titanium and vanadium halides, oxyhalides or alkoxyhalides, such as titanium tetrachloride (TiCl$_4$), vanadium tetrachloride (VCl$_4$) and vanadium oxytrichloride (VOCl$_3$), and titanium and vanadium alkoxides, wherein the alkoxide moiety has a branched or unbranched alkyl group of 1 to 20 carbon atoms, preferably 1 to 6 carbon atoms. Ziegler catalysts may be "supported" using known techniques, such as by using magnesium compounds, and may be used in conjunction with so called "internal" and/or "external" electron donors; and further, may be supported using such materials as inorganic oxides.

As mentioned above, in one embodiment, Group 15-containing catalyst components are usefull in the present invention and include Group 4 imino-phenol complexes, Group 4 bis(amido) complexes, and Group 4 pyridyl-amide complexes that are active towards olefin polymerization to any extent. The Group 15-containing catalyst component may be more particularly described by the following formula (V):

$$\beta_b(\alpha)_a \gamma_g MX_n \qquad (V)$$

wherein β and γ are groups that each comprise at least one Group 14 to Group 16 atom; and β (when present) and γ are groups bonded to M through between 1 and 4 Group 14 to Group 16 atoms, at least two atoms being Group 15-containing atoms;

more particularly, β and γ are groups selected from Group 14 and Group 15-containing (and their non-valent equivalents when not linked by a group α): alkyls, aryls, alkylaryls, and heterocyclic hydrocarbons, and chemically bonded combinations thereof in one embodiment; and selected from Group 14 and Group 15-containing: $C_1$ to $C_{10}$ alkyls, $C_6$ to $C_{12}$ aryls, $C_6$ to $C_{18}$ alkylaryls, and $C_4$ to $C_{12}$ heterocyclic hydrocarbons, and chemically bonded combinations thereof in a more particular embodiment; and selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen containing heterocyclic hydrocarbons, and $C_4$ to $C_{12}$ alkyl substituted nitrogen containing heterocyclic hydrocarbons and chemically bonded combinations thereof in yet a more particular embodiment; and selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof in yet a more particular embodiment;

α is a linking (or "bridging") moiety that, when present, forms a chemical bond to each of β and γ, or two γ's, thus forming a "γαγ" or "γαβ" ligand bound to M; α may also include a Group 14 to Group 16 atom which may be bonded to M through the Group 14 to Group 16 atom in one embodiment; and more particularly, α is a divalent bridging group selected from alkylenes, arylenes, alkenylenes, heterocyclic arylenes, alkylarylenes, heteroatom containing alkylenes, heteroatom containing alkenylenes and heterocyclic hydrocarbonylenes in one embodiment; and selected from $C_1$ to $C_{10}$ alkylenes, $C_2$ to $C_{10}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof in yet a more particular embodiment;

a is 0 or 1;

b is an integer from 0 to 2;

g is an integer from 1 to 2; wherein in one embodiment, a is 1, b is 0 and g is 2;

M is selected from Group 3 to Group 12 atoms in one embodiment; and selected from Group 3 to Group 10 atoms in a more particular embodiment; and selected from Group 3 to Group 6 atoms in yet a more particular embodiment; and selected from Ni, Cr, Ti, Zr and Hf in yet a more particular embodiment; and selected from Zr and Hf in yet a more particular embodiment;

each X is as defined above for A and B in structure (IV); and n is an integer from 0 to 4 in one embodiment; and an integer from 1 to 3 in a more particular embodiment; and an integer from 2 to 3 in yet a more particular embodiment.

As used herein, "chemically bonded combinations thereof" means that adjacent groups, (β and γ groups) may form a chemical bond between them; in one embodiment, the β and γ groups are chemically bonded through one or more α groups there between.

As used herein, the terms "alkyleneamines", "aryleneamines", describe alkylamines and arylamines (respectively) that are deficient by two hydrogens, thus capable of forming chemical bonds with two adjacent γ groups, or adjacent β and γ groups. Thus, an example of an alkyleneamine is —$CH_2CH_2N(CH_3)CH_2CH_2$— and —$CH_2CH_2N(H)CH_2CH_2$— and an example of a heterocyclic hydrocarbylene or aryleneamine is —$C_5H_3N$— (divalent pyridine). An "alkylene-arylamine" is a group such as, for example, —$CH_2CH_2(C_5H_3N)CH_2CH_2$—.

Scavenger Compounds

When using the catalysts of the invention, particularly when immobilized on a support, the total catalyst system may additionally comprise one or more scavenging compounds in one embodiment. The term "scavenging compounds" as used in this application and its claims is meant to include those compounds effective for removing, preferably polar, impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion precursors activate the catalyst system. The polar impurities, or catalyst poisons, include water, oxygen, metal impurities, etc. Preferably steps are taken before provision of such into the reaction vessel, for example by chemical treatment or careful separation techniques after or during the synthesis or preparation of the various components, but some minor amounts of scavenging compound might still normally be used in the polymerization process itself.

Typically the scavenging compound will be an excess of the halogenated aromatic aluminum activator compound needed for initiation of the polymerization reaction, as described above, or will be additional known organometallic compounds such as the Group 13 organometallic compounds of U.S. Pat. Nos. 5,153,157 and 5,241,025 and WO 91/09882, WO 94/03506, WO 93/14132, and WO 95/07941. Exemplary compounds include triethyl aluminum, triethyl borane, triisobutyl aluminum, methylalumoxane, isobutyl aluminumoxane, and tri-n-octyl aluminum. Those scavenging compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as an additional activator, any excess over the amount needed to activate the catalysts present will act as scavenger compounds and additional scavenging compounds may not be necessary. Alumoxanes also may be used in scavenging amounts with other means of activation, e.g., methylalumoxane and triisobutyl-aluminoxane. The amount of scavenging agent to be used with Group 4 to 10 catalyst compounds of the invention is minimized during polymerization reactions to that amount effective to enhance activity and avoided altogether if the feeds and polymerization medium can be sufficiently free of adventitious impurities.

Polymerization Process

The catalyst complexes of the invention are useful in polymerization of unsaturated monomers conventionally known to be polymerizable under coordination polymerization using metallocenes. Such conditions are well known and include solution polymerization, slurry polymerization, gas-phase polymerization, and high pressure polymerization. The catalyst of the invention are supported (preferably as described above) and as such will be particularly useful in the known operating modes employing fixed-bed, moving-bed, fluid-bed, slurry or solution processes conducted in single, series or parallel reactors. Prepolymerization of supported catalyst of the invention may also be used for further control of polymer particle morphology in typical slurry or gas phase reaction processes in accordance with conventional teachings.

In alternative embodiments of olefin polymerization methods for this invention, the catalyst system is employed in liquid phase (solution, slurry, suspension, bulk phase or combinations thereof), in high pressure liquid or supercritical fluid phase, or in gas phase. Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352,749, 5,436,304, 5,453,471 and 5,463,999, and PCT publication WO 95/07942.

Generally speaking the polymerization reaction temperature can vary from about 40° C. to about 250° C. Preferably the polymerization reaction temperature will be from 60° C. to 220° C., more preferably below 200° C. The pressure can vary from about 1 mm Hg to 2500 bar (2467 atm), preferably from 0.1 bar (0.1 atm) to 1600 bar (1579 atm), more preferably from 1.0 bar (0.98 atm) to 500 bar (490 atm), and even more preferably from 1 bar to 100 bar (95 atm).

Linear polyethylene, including high and ultra-high molecular weight polyethylenes, including both homo- and co-polymers with other α-olefin monomers, α-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically <50 bar (49 atm)), at a typical temperature of 40° C. to 250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000 to 3000 kPa and 60° C. to 160° C., using hydrogen as a reaction modifier (for example, 100 ppm to 200 ppm), $C_4$ to $C_8$ comonomer feed stream (0.5 mol % to 1.2 mol %), and $C_2$ feed stream (25 mol % to 35 mol %). See U.S. Pat. Nos. 4,543,399, 4,588,790, 5,028,670 and 5,405,922 and 5,462,999.

Ethylene-α-olefin (including ethylene-cyclic olefin and ethylene-α-olefin-diolefin) elastomers of high molecular weight and low crystallinity can be prepared utilizing the catalysts under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 psig and 1000 psig (69 kPa to 6895 kPa) and the polymerization diluent temperature will typically be between 40° C. and 160° C. The process can be carried out in a stirred tank reactor, or more than one operated in series or parallel. See the general disclosure of U.S. Pat. No. 5,001,205 for general process conditions. See also PCT publication WO 96/33227 and WO 97/22639.

Other olefinically unsaturated monomers besides those specifically described above may be polymerized using the catalysts according to the invention, for example, styrene, alkyl-substituted styrene, isobutylene, ethylidene norbornene, norbornadiene, dicyclopentadiene, and other olefinically-unsaturated monomers, including other cyclic olefins, such as cyclopentene, norbornene, and alkyl-substituted norbornenes. Additionally, α-olefinic macromonomers of up to 1000 mer units, or more, may also be incorporated by copolymerization.

Polymer Products

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 4, particularly greater than 2 to about 3.5, more preferably greater than about 2 to less than about 3, and most preferably from about 2 to 3.

The melt strength of the polymers produced using the catalyst of the invention are in the range of from 6.5 cN to about 11 cN, preferably from 7 cN to 11 cN, and more preferably in the range of from 7 cN to 10 cN, and most preferably in the range of from 7 to 10 at an $I_2$ of about 1 g/10 min. For purposes of this patent application and appended claims melt strength is measured with an Instron capillary rheometer in conjunction with the Goettfert Rheotens melt strength apparatus. A polymer melt strand extruded from the capillary die is gripped between two counter-rotating wheels on the apparatus. The take-up speed is increased at a constant acceleration of 24 mm/sec$^2$, which is controlled by the Acceleration Programmer (Model 45917, at a setting of 12). The maximum pulling force (in the unit of cN) achieved before the strand breaks or starts to show draw-resonance is determined as the melt strength. The temperature of the rheometer is set at 190° C. The capillary die has a length of one inch (2.54 cm) and a diameter of 0.06" (0.15 cm). The polymer melt is extruded from the die at a speed of 3 inch/min (7.62 cm/min). The distance between the die exit and the wheel contact point should be 3.94 inches (100 mm).

In preferred embodiment, the Melt Strength (MS) (measured in cN) of the polymers of the invention satisfy the following equation:

$$MS \geq 6.5 - 5.2 \times \log(MI);$$

wherein MI is the Melt Index or $I_2$ as determined using ASTM-D-1238-E (190/2.16). It is even more preferable that the MI in the formula above be in the range of from 0.4 dg/min to 5 dg/min., yet even more preferably from 0.5 dg/min to 4 dg/min, and most preferably from about 0.5 dg/min to 3 dg/min, especially for use in producing a film grade product.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093. The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

The polymers of the present invention in one embodiment have a melt index (MI) or ($I_2$) as measured by ASTM-D-1238-E in the range from 0.01 dg/min to 100 dg/min, more preferably from about 0.01 dg/min to about 10 dg/min, even more preferably from about 0.1 dg/min to about 5 dg/min, and most preferably from about 0.1 dg/min to about 3 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25 and most preferably from about 15 about 20.

In yet another embodiment, propylene based polymers are produced in the process of the invention. These polymers include atactic polypropylene, isotactic polypropylene, hemiisotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117.

The polymers of the invention may be blended and/or coextruded with any other polymer. Non-limiting examples of other polymers include linear low density polyethylenes produced via conventional Ziegler-Natta and/or metallocene-type catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and nonfood contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Thus, the present invention in one embodiment is a method of forming a supported activator composition comprising combining: (a) a halogenated aromatic aluminum activator compound with: (b) a fluorinated support and a catalyst to form a supported activated catalyst composition; wherein the fluorinated support possesses from 0.001 mmol OH/g inorganic oxide to 1 mmol OH/g inorganic oxide. In another embodiment, the supported activated catalyst composition comprises no more than 0.001 mmol OH/g silica.

In one embodiment, the method further comprises the step of removing the reaction products resulting from the combination of (a) and (b). This can be done by techniques known in the art, such as by extraction with a diluent.

In one another embodiment, a catalyst compound is combined with the halogenated aromatic aluminum activator compound prior to being combined with the fluorinated support. In another embodiment, a catalyst compound is combined with the fluorinated support at the same time as the halogenated aromatic aluminum activator compound.

In another embodiment, the halogenated aromatic aluminum activator compound is combined with the fluorinated support in an amount of from 1OH:1Al to 1OH:5Al (molar ratio).

A catalyst composition may be formed by combining a catalyst compound with the supported activator composition to form a supported activated catalyst composition. In one embodiment, the catalyst compounds are selected from metallocenes and Group 15-containing catalyst compounds. Ziegler-Natta catalyst may also be part of the catalyst composition. Additional activators such as non-coordinating activators or "stoichiometric activators" (such as disclosed in, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000)), alkylaluminum compounds and/or alumoxanes may also be present either as supported on the fluorinated support, or in the polymerization reactor as a separate component from the catalyst compositions of the invention. The catalyst compositions of the invention may also include indoles and other heterocyclic compounds and substituted versions thereof.

In one embodiment, the halogenated aromatic aluminum activator compound comprises at least two fluorine atoms; and comprises a tetrafluoro compound or a trifluoro compound in another embodiment. In yet another embodiment, the halogenated aromatic aluminum activator compound can be described by the formula $R_n Al(ArHal)_{3-n}$, wherein ArHal is a halogenated aryl group, R is a monoanionic ligand, and n is 1 or 2. In one embodiment, the supported activated catalyst includes aluminum from the activator in an amount of from 2 wt % to 0.35 wt %. In yet another embodiment, the fluorinated support comprises from less than about 0.1 mmol OH/g silica after combination with the halogenated aromatic aluminum activator (i.e., the supported activator).

The fluorinated support is first formed by combining a fluorinating agent with the inorganic oxide at a temperature of from less than 700° C. in one embodiment, and at a temperature of less than 600° C. in another embodiment. The fluorinated support comprises an inorganic support selected from the group consisting of talc, clay, silica, alumina, magnesia, zirconia, iron oxides, boria, calcium oxide, zinc oxide, barium oxide thoria, aluminum phosphate gel, hydroxylated polyvinylchloride and hydroxylated polystyrene in one embodiment.

In a particular embodiment, the present invention includes a catalyst composition comprising the reaction product of a fluorinated support; a perfluorophenyl aluminum activator compound; and a metallocene catalyst. In one embodiment, the perfluorophenyl aluminum activator compound is bound to the fluorinated support. In another embodiment, the metallocene catalyst is combined with the perfluorophenyl aluminum activator compound after combining the perfluorophenyl aluminum activator with the fluorinated support.

The catalyst composition is useful in olefin polymerization. Thus, the present invention includes a method of polymerizing olefins comprising combining:
(a) ethylene and optionally one or more α-olefins, preferably $C_3$ to $C_{10}$ α-olefins; even more preferably 1-butene and 1-hexene; and (b) a catalyst composition formed by combining:
  (i) a halogenated aromatic aluminum activator compound, and
  (ii) a fluorinated support and a catalyst to form a supported activated catalyst composition; wherein the fluorinated support possesses from 0.001 mmol OH/g inorganic oxide to 1 mmol OH/g inorganic oxide;
  (iii) isolating a supported activator composition; then
  (iv) combining the supported activator composition with a catalyst compound.

The process may take place under any desirable reaction conditions in slurry phase or a gas phase process; a fluidized bed gas phase process at a temperature of from 50° C. to 120° C. and from less than 100 bar (95 atm) being particularly desirable. The process thus producing ethylene homopolymers or copolymers. Further, the ethylene homopolymer or copolymer is further isolated in one embodiment of the invention, the homopolymer or copolymer useful in a number of articles, including films, geomembranes, injection molded articles, and other useful products. If two or more catalyst compounds are present during polymerization, preferably both bound to the fluorinated support, the resultant bimetallic catalyst composition is capable of producing bimodal polymer compositions suitable for such applications as films and pipes.

EXAMPLES

CATALYST A: A fluorinated silica support activated with perfluorophenylaluminum, i.e., Si—O—Al($C_6F_5$)$_2$, was formed in the following manner. First, 2 g of silica previously fluorinated and calcined at 600° C., prepared by Grace Davison, was added to 20 mL of dry toluene at room temperature to form a slurry. The slurry was then combined with 0.446 grams of perfluorophenylaluminum (Al($C_6F_5$)$_3$) in toluene and left overnight. The reaction was then filtered and the silica rinsed with toluene. The reaction was then re-slurried into toluene and 0.11 g of a 20 wt. % solution of (1,3-BuMeCp)$_2$ZrMe$_2$ in toluene was added to the slurried support. After several hours, the support was filtered, rinsed with toluene, and dried under vacuum.

CATLYST B: A fluorinated silica support activated with perfluorophenylaluminum, i.e., Si—O—Al($C_6F_5$)$_2$, was formed in the following manner. First, 2 g of silica previously fluorinated and calcined at 600° C., commercially available from Grace Davison, was added to 20 mL of dry toluene at room temperature to form a slurry. The slurry was then combined with 0.446 grams of perfluorophenylaluminum (Al($C_6F_5$)$_3$) in toluene and left overnight. The reaction was then filtered and the silica rinsed with toluene. The reaction was then re-slurried into toluene and 0.11 g of a 20 wt. % solution of Me$_2$Si(H$_4$-indenyl)$_2$Zr(CH$_3$)$_2$ in toluene was added to the slurried support. After several hours, the support was filtered, rinsed with toluene, and dried under vacuum.

POLYMERIZATIONS: The above supported activated catalyst were used to perform polymerizations in a glass-lined 20 mL autoclave reactor. The reactor was charged with ethylene while stirring at 800 RPM. The supported activated catalyst was slurried and added via a syringe. The polymerization was continued until a fixed uptake of ethylene was noted or until a maximum reaction time of 40 minutes had passed. The polymer was recovered under vacuum and the bulk polymerization activity was calculated by dividing the yield of polymer by the total weight of the catalyst charge by the time in hours and by the absolute monomer pressure in atmospheres, as summarized in Table 1 below.

The process described above resulting in increased yields and catalyst activities in comparison to catalysts supported by non-fluorinated supports.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

| Catalyst | Average MW | Yield (g) | Activity (g PE/$g_{cat}$/hr) |
| --- | --- | --- | --- |
| A | 344,906 | 0.127 | 656.8 |
| A | 367,278 | 0.141 | 1166.6 |
| A | 342,035 | 0.123 | 602.1 |
| A | 338,592 | 0.118 | 618.1 |
| B | 640,727 | 0.017 | 50.4 |
| B | 528,985 | 0.026 | 77 |
| B | 519,760 | 0.024 | 71.1 |
| B | 490,424 | 0.023 | 68.1 |

What is claimed is:

1. A method of forming a supported catalyst composition comprising combining (a) a halogenated aromatic aluminum activator compound with (b) a fluorinated support and one or more catalysts to form a supported activated catalyst composition; wherein the fluorinated support possesses from 0.001 mmol OH/g support to 1 mmol OH/g support.

2. The method of claim 1, further comprising the step of removing the reaction products resulting from the combination of (a) and (b).

3. The method of claim 1, wherein the one or more catalyst compounds are selected from the group consisting of metallocenes and Group 15-containing catalyst compounds.

4. The method of claim 1, wherein the halogenated aromatic aluminum activator compound comprises at least two fluorine atoms.

5. The method of claim 1, wherein the halogenated activator compound comprises a tetrafluoro compound or a trifluoro compound.

6. The method of claim 1, wherein the halogenated aromatic aluminum activator compound has the formula R$_n$Al(ArHal)$_{3-n}$, wherein ArHal is a halogenated aryl group, R is a monoanionic ligand, and n is 1 or 2.

7. The method of claim 1, wherein the supported activated catalyst composition comprises no more than 0.001 mmol OH/g silica.

8. The method of claim 1, wherein the supported activated catalyst includes aluminum in an amount of from 2 wt % to 0.35 wt % by weight of supported activated catalyst.

9. The method of claim 1, wherein the fluorinated support comprises from less than about 0.1 mmol OH/g silica after combination with the halogenated aromatic aluminum activator.

10. The method of claim 1, wherein the fluorinated support is first formed by combining a fluorinating agent with the inorganic oxide at a temperature of from less than 700° C.

11. The method of claim 1, wherein the catalyst comprises a metallocene compound.

12. The method of claim 1, wherein the fluorinated support comprises an inorganic support selected from the group consisting of talc, clay, silica, alumina, magnesia, zirconia, iron oxides, boria, calcium oxide, zinc oxide, barium oxide thoria, aluminum phosphate gel, hydroxylated polyvinylchloride and hydroxylated polystyrene.

13. The method of claim 2, wherein the catalyst compound is combined with the halogenated aromatic aluminum activator compound prior to being combined with the fluorinated support.

14. The method of claim 2, wherein the catalyst is combined with the fluorinated support at the same time as the halogenated aromatic aluminum activator compound.

15. The method of claim 1, wherein the halogenated aromatic aluminum activator compound is combined with the fluorinated support in an amount of from 1OH:1Al to 1OH:5Al (molar ratio).

16. The method of claim 1, wherein the method consists essentially of combining (a) a halogenated aromatic aluminum activator compound with (b) a fluorinated support and one or more catalysts to form a supported activated catalyst composition.

* * * * *